United States Patent
I et al.

(10) Patent No.: US 8,583,900 B2
(45) Date of Patent: Nov. 12, 2013

(54) REGISTER RENAMING TABLE RECOVERY METHOD AND SYSTEM FOR USE IN A PROCESSOR

(75) Inventors: Chien-Nan I, Hsinchu (TW); Chun-Wang Wei, Hsinchu (TW)

(73) Assignee: RDC Semiconductor Co., Ltd., Hsinchu (TW)

( * ) Notice: Subject to any disclaimer, the term of this patent is extended or adjusted under 35 U.S.C. 154(b) by 1030 days.

(21) Appl. No.: 12/619,876

(22) Filed: Nov. 17, 2009

(65) Prior Publication Data

US 2010/0312993 A1    Dec. 9, 2010

(30) Foreign Application Priority Data

Jun. 8, 2009  (TW) ................................ 98119113 A

(51) Int. Cl.
*G06F 9/30*    (2006.01)
(52) U.S. Cl.
USPC ........................................................ 712/217
(58) Field of Classification Search
USPC ........................................................ 712/217
See application file for complete search history.

(56) References Cited

U.S. PATENT DOCUMENTS

| | | | | |
|---|---|---|---|---|
| 5,675,759 A * | 10/1997 | Shebanow et al. | ............ | 712/217 |
| 5,694,564 A * | 12/1997 | Alsup et al. | .................. | 712/216 |
| 5,758,112 A * | 5/1998 | Yeager et al. | ................. | 712/217 |
| 5,794,024 A * | 8/1998 | Golla et al. | .................... | 712/228 |
| 5,961,636 A * | 10/1999 | Brooks et al. | ................. | 712/228 |
| 6,633,970 B1 * | 10/2003 | Clift et al. | ..................... | 712/217 |
| 7,155,599 B2 | 12/2006 | Jourdan et al. | | |
| 2007/0043934 A1 * | 2/2007 | Sodani et al. | ................. | 712/228 |
| 2008/0077782 A1 | 3/2008 | Lataille et al. | | |
| 2008/0148002 A1 | 6/2008 | Fleming | | |
| 2008/0148282 A1 | 6/2008 | Sodani et al. | | |

OTHER PUBLICATIONS

Moudgill et al., "Register Renaming and Dynamic Speculation: an Alternative Approach", Sep. 15, 1993, 13 pages.*

* cited by examiner

*Primary Examiner* — David J Huisman
(74) *Attorney, Agent, or Firm* — WPAT, PC; Justin King

(57) ABSTRACT

A register renaming table recovery method for use in a processor includes the following steps. Firstly, a flushing operation is performed on a renaming-history table according to a flushed ID. Then, a first renamed ID corresponding to a first register is acquired from an unflushed row of the renaming-history table that is immediately adjacent to the flushed ID. If the first renamed ID is occupied, a register renaming table is updated to rename the first register according to the first renamed ID. Whereas, if the first renamed ID is not occupied, the register renaming table is updated to keep the first register unrenamed.

15 Claims, 18 Drawing Sheets

1. R1 ← MEM[1024]
2. R1 ← R1+2
3. MEM[1032] ← R1
4. R1 ← MEM[2048]
5. R1 ← R1+4
6. MEM[2056] ← R1

FIG. 1A
(PRIOR ART)

1. R1 ← MEM[1024]    R2 ← MEM[2048]
2. R1 ← R1+2         R2 ← R2+4
3. MEM[1032] ← R1    MEM[2056] ← R2

FIG. 1B
(PRIOR ART)

| | AX | BX | CX | DX |
|---|---|---|---|---|
| | ID1 | - | - | - |

Register renaming table

| ID | AX | BX | CX | DX | OC |
|---|---|---|---|---|---|
| 1 | ID1 | - | - | - | 1 |
| 2 | - | - | - | - | 0 |
| 3 | - | - | - | - | 0 |
| 4 | - | - | - | - | 0 |
| 5 | - | - | - | - | 0 |
| 6 | - | - | - | - | 0 |
| 7 | - | - | - | - | 0 |
| 8 | - | - | - | - | 0 |

Renaming-history table

FIG. 3A (PRIOR ART)

```
a.   AX ← MEM[1024]
b.   BX ← AX+2
c.   BX ← CX
d.   CX ← BX+5
e.   DX ← AX+3
f.   AX ← CX
g.   DX ← BX+4
h.   BX ← AX+5
```

FIG. 2 (PRIOR ART)

Register renaming table

| AX | BX | CX | DX |
|---|---|---|---|
| ID1 | ID2 | - | - |

Renaming-history table

| ID | AX | BX | CX | DX | OC |
|---|---|---|---|---|---|
| 1 | ID1 | - | - | - | 1 |
| 2 | ID1 | ID2 | - | - | 1 |
| 3 | - | - | - | - | 0 |
| 4 | - | - | - | - | 0 |
| 5 | - | - | - | - | 0 |
| 6 | - | - | - | - | 0 |
| 7 | - | - | - | - | 0 |
| 8 | - | - | - | - | 0 |

FIG. 3B (PRIOR ART)

Register renaming table

| AX | BX | CX | DX |
|---|---|---|---|
| ID1 | ID3 | - | - |

Renaming-history table

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 1 |
| 4 | - | - | - | - | 0 |
| 5 | - | - | - | - | 0 |
| 6 | - | - | - | - | 0 |
| 7 | - | - | - | - | 0 |
| 8 | - | - | - | - | 0 |

FIG. 3C (PRIOR ART)

Register renaming table

| AX | BX | CX | DX |
|----|----|----|----|
| ID1 | ID3 | ID4 | ID5 |

Renaming-history table

| ID | AX | BX | CX | DX | OC |
|----|----|----|----|----|----|
| 1 | ID1 | - | - | - | 1 |
| 2 | ID1 | ID2 | - | - | 1 |
| 3 | ID1 | ID3 | - | - | 1 |
| 4 | ID1 | ID3 | ID4 | - | 1 |
| 5 | ID1 | ID3 | ID4 | ID5 | 1 |
| 6 | - | - | - | - | 0 |
| 7 | - | - | - | - | 0 |
| 8 | - | - | - | - | 0 |

FIG. 3E (PRIOR ART)

Register renaming table

| AX | BX | CX | DX |
|----|----|----|----|
| ID1 | ID3 | ID4 | - |

Renaming-history table

| ID | AX | BX | CX | DX | OC |
|----|----|----|----|----|----|
| 1 | ID1 | - | - | - | 1 |
| 2 | ID1 | ID2 | - | - | 1 |
| 3 | ID1 | ID3 | - | - | 1 |
| 4 | ID1 | ID3 | ID4 | - | 1 |
| 5 | - | - | - | - | 0 |
| 6 | - | - | - | - | 0 |
| 7 | - | - | - | - | 0 |
| 8 | - | - | - | - | 0 |

FIG. 3D (PRIOR ART)

Register renaming table (FIG. 3F)

| AX | BX | CX | DX |
|---|---|---|---|
| ID6 | ID3 | ID4 | ID5 |

Renaming-history table (FIG. 3F)

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 1 |
| 4 | ID1 | ID3 | ID4 | - | 1 |
| 5 | ID1 | ID3 | ID4 | ID5 | 1 |
| 6 | ID6 | ID3 | ID4 | ID5 | 1 |
| 7 | - | - | - | - | 0 |
| 8 | - | - | - | - | 0 |

FIG. 3F (PRIOR ART)

Register renaming table (FIG. 3G)

| AX | BX | CX | DX |
|---|---|---|---|
| ID6 | ID3 | ID4 | ID7 |

Renaming-history table (FIG. 3G)

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 1 |
| 4 | ID1 | ID3 | ID4 | - | 1 |
| 5 | ID1 | ID3 | ID4 | ID5 | 1 |
| 6 | ID6 | ID3 | ID4 | ID5 | 1 |
| 7 | ID6 | ID3 | ID4 | ID7 | 1 |
| 8 | - | - | - | - | 0 |

FIG. 3G (PRIOR ART)

Register renaming table

| AX | BX | CX | DX |
|---|---|---|---|
| ID6 | ID8 | ID4 | ID7 |

Renaming-history table

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 1 |
| 4 | ID1 | ID3 | ID4 | - | 1 |
| 5 | ID1 | ID3 | ID4 | ID5 | 1 |
| 6 | ID6 | ID3 | ID4 | ID5 | 1 |
| 7 | ID6 | ID3 | ID4 | ID7 | 1 |
| 8 | ID6 | ID8 | ID4 | ID7 | 1 |

FIG. 3H (PRIOR ART)

Register renaming table

| AX | BX | CX | DX |
|---|---|---|---|
| ID6 | ID8 | ID4 | ID7 |

Renaming-history table

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 0 |
| 4 | ID1 | ID3 | ID4 | - | 1 |
| 5 | ID1 | ID3 | ID4 | ID5 | 1 |
| 6 | ID6 | ID3 | ID4 | ID5 | 1 |
| 7 | ID6 | ID3 | ID4 | ID7 | 1 |
| 8 | ID6 | ID8 | ID4 | ID7 | 1 |

FIG. 3I (PRIOR ART)

Register renaming table

| AX | BX | CX | DX |
|---|---|---|---|
| ID6 | ID8 | ID4 | ID7 |

Renaming-history table

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | - | - | - | 0 |
| 4 | ID1 | - | ID4 | - | 1 |
| 5 | ID1 | - | ID4 | ID5 | 1 |
| 6 | ID6 | - | ID4 | ID5 | 1 |
| 7 | ID6 | - | ID4 | ID7 | 1 |
| 8 | ID6 | ID8 | ID4 | ID7 | 1 |

FIG. 3J (PRIOR ART)

Register renaming table

| AX | BX | CX | DX |
|---|---|---|---|
| ID6 | ID8 | ID4 | ID7 |

Renaming-history table

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | - | ID4 | - | 0 |
| 4 | ID1 | - | ID4 | - | 0 |
| 5 | ID1 | - | ID4 | ID5 | 1 |
| 6 | ID6 | - | ID4 | ID5 | 1 |
| 7 | ID6 | - | ID4 | ID7 | 1 |
| 8 | ID6 | ID8 | ID4 | ID7 | 1 |

a. AX ← MEM[1024]
b. BX ← AX+2
c. BX ← CX
d. CX ← BX+5
e. DX ← AX+3
f. cBranch
g. AX ← CX
h. DX ← BX+4
i. BX ← AX+5

Register renaming table

| AX | BX | CX | DX |
|----|----|----|----|
| ID6 | ID8 | - | ID7 |

Renaming-history table

| ID | AX | BX | CX | DX | OC |
|----|----|----|----|----|----|
| 1 | ID1 | - | - | - | 1 |
| 2 | ID1 | ID2 | - | - | 1 |
| 3 | ID1 | - | - | - | 0 |
| 4 | ID1 | - | - | - | 0 |
| 5 | ID1 | - | - | ID5 | 1 |
| 6 | ID6 | - | - | ID5 | 1 |
| 7 | ID6 | - | - | ID7 | 1 |
| 8 | ID6 | ID8 | - | ID7 | 1 |

Register renaming table:

| AX | BX | CX | DX |
|---|---|---|---|
| ID6 | ID8 | - | ID7 |

Renaming-history table:

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | - | - | - | 0 |
| 4 | ID1 | - | - | - | 0 |
| 5 | ID1 | - | - | ID5 | 1 |
| 6 | ID1 | - | - | ID5 | 1 |
| 7 | ID6 | - | - | ID5 | 1 |
| 8 | ID6 | - | - | ID7 | 1 |
| 9 | ID6 | ID8 | - | ID7 | 1 | cBranch → row 6

Fig. 5B (PRIOR ART)

Register renaming table:

| AX | BX | CX | DX |
|---|---|---|---|
| ID6 | ID8 | - | ID7 |

Renaming-history table:

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | - | - | - | 0 |
| 4 | ID1 | - | - | - | 0 |
| 5 | ID1 | - | - | ID5 | 1 |
| 6 | - | - | - | - | 0 |
| 7 | - | - | - | - | 0 |
| 8 | - | - | - | - | 0 |
| 9 | - | - | - | - | 0 | cBranch → row 6

Register renaming table

| AX  | BX | CX | DX  |
|-----|----|----|-----|
| ID1 | -  | -  | ID5 |

Renaming-history table

| ID | AX  | BX  | CX | DX  | OC |
|----|-----|-----|----|-----|----|
| 1  | ID1 | -   | -  | -   | 1  |
| 2  | ID1 | ID2 | -  | -   | 1  |
| 3  | ID1 | -   | -  | -   | 0  |
| 4  | ID1 | -   | -  | -   | 0  |
| 5  | ID1 | -   | -  | ID5 | 1  |
| 6  | -   | -   | -  | -   | 0  |
| 7  | -   | -   | -  | -   | 0  |
| 8  | -   | -   | -  | -   | 0  |
| 9  | -   | -   | -  | -   | 0  |

↑ cBranch

Table 206:

| AX | BX | CX | DX |
|---|---|---|---|
| ID1 | - | - | - |

Table 220:

| ID | AX | BX | CX | DX | OC |
|---|---|---|---|---|---|
| 1 | ID1 | - | - | - | 1 |
| 2 | - | - | - | - | 0 |
| 3 | - | - | - | - | 0 |
| 4 | - | - | - | - | 0 |
| 5 | - | - | - | - | 0 |
| 6 | - | - | - | - | 0 |
| 7 | - | - | - | - | 0 |
| 8 | - | - | - | - | 0 |
| 9 | - | - | - | - | 0 |

FIG. 7B

Table 206:

| AX | BX | CX | DX |
|---|---|---|---|
| ID6 | ID8 | ID4 | ID7 |

Table 220:

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 1 |
| 4 | ID1 | ID3 | ID4 | - | 1 |
| 5 | ID1 | ID3 | ID4 | ID5 | 1 |
| 6 | ID1 | ID3 | ID4 | ID5 | 1 |
| 7 | ID6 | ID3 | ID4 | ID5 | 1 |
| 8 | ID6 | ID3 | ID4 | ID7 | 1 |
| 9 | ID6 | ID8 | ID4 | ID7 | 1 |

FIG. 7C

Table 206:

| AX | BX | CX | DX |
|---|---|---|---|
| ID6 | ID8 | ID4 | ID7 |

Table 220:

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 0 |
| 4 | ID1 | ID3 | ID4 | - | 1 |
| 5 | ID1 | ID3 | ID4 | ID5 | 1 |
| 6 | ID6 | ID3 | ID4 | ID5 | 1 |
| 7 | ID6 | ID3 | ID4 | ID5 | 1 |
| 8 | ID6 | ID3 | ID4 | ID7 | 1 |
| 9 | ID6 | ID8 | ID4 | ID7 | 1 |

FIG. 7D

Table 206:

| AX | BX | CX | DX |
|---|---|---|---|
| ID6 | ID8 | - | ID7 |

Table 220:

| ID | AX | BX | CX | DX | OC |
|---|---|---|---|---|---|
| 1 | ID1 | - | - | - | 1 |
| 2 | ID1 | ID2 | - | - | 1 |
| 3 | ID1 | ID3 | - | - | 0 |
| 4 | ID1 | ID3 | ID4 | - | 0 |
| 5 | ID1 | ID3 | ID4 | ID5 | 1 |
| 6 | ID6 | ID3 | ID4 | ID5 | 1 |
| 7 | ID6 | ID3 | ID4 | ID5 | 1 |
| 8 | ID6 | ID3 | ID4 | ID7 | 1 |
| 9 | ID6 | ID8 | ID4 | ID7 | 1 |

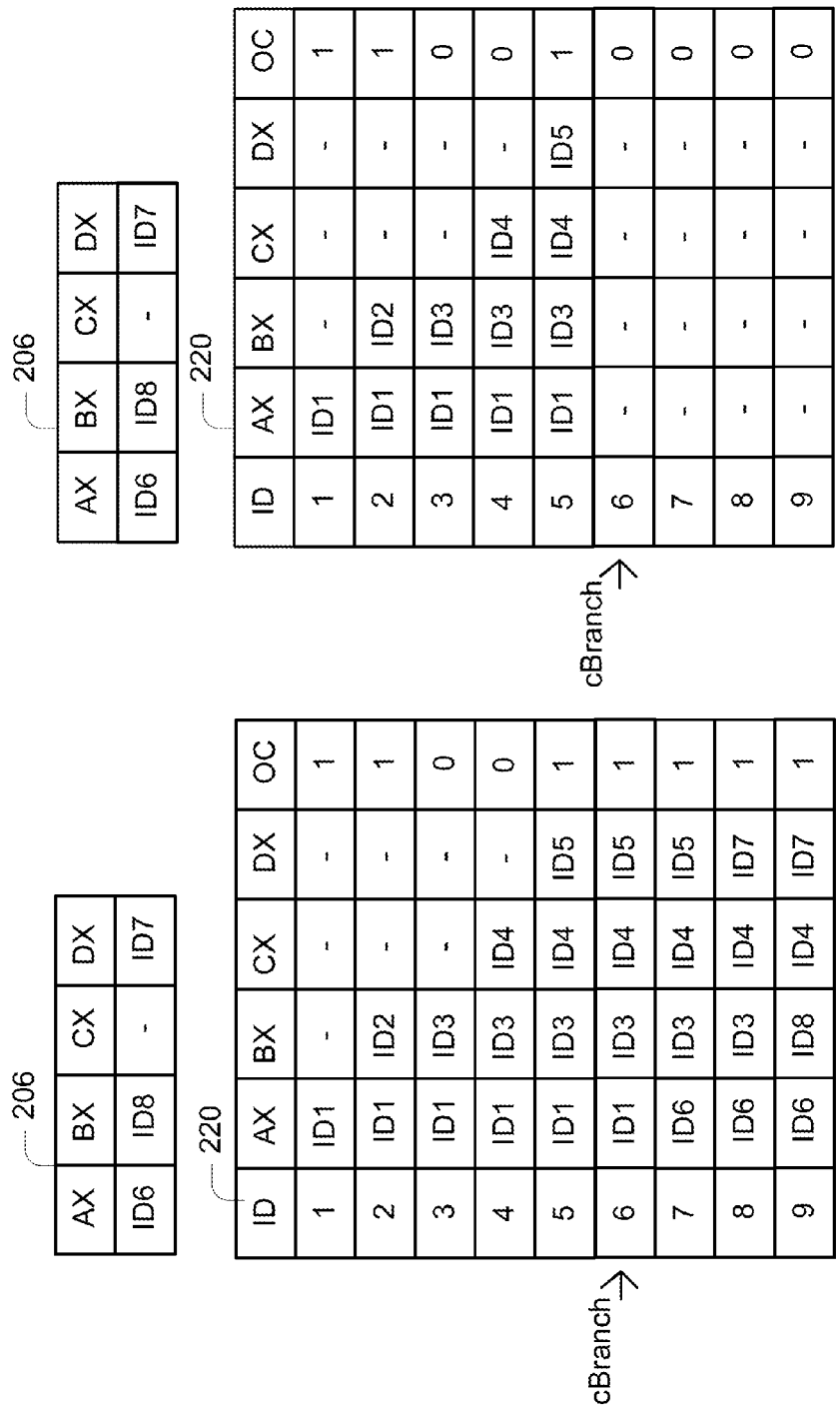

REGISTER RENAMING TABLE RECOVERY METHOD AND SYSTEM FOR USE IN A PROCESSOR

FIELD OF THE INVENTION

The present invention relates to a recovery method and recovery system for use in a processor, and more particularly to a register renaming table recovery method and a register renaming table recovery system for use in a processor.

BACKGROUND OF THE INVENTION

With increasing development of the processor, the demand on the operating efficiency of the processor is gradually increased. Take an out-of-order processor for example. By using a register-renaming technology, the data-dependence problem is solved. As such, the processor could execute the instruction without the need of following the sequence of the source codes.

FIG. 1A schematically illustrates a process of executing a program without using a register-renaming technology according to the prior art. FIG. 1B schematically illustrates a process of executing a program by using a register-renaming technology according to the prior art.

The actions of executing the program by a processor could be understood from the pseudo codes shown in FIG. 1A. In the first step, a memory read action is implemented to temporarily store the data of the memory address [1024] into the R1 register. In the step 2, the data stored in the R1 register is added by 2, and then the result is stored back to the R1 register. In the step 3, a memory write action is implemented to write the data that is stored in the R1 register into the memory address [1032]. In the fourth step, a memory read action is implemented to temporarily store the data of the memory address [2048] into the R1 register. In the step 5, the data stored in the R1 register is added by 4, and then the result is stored back to the R1 register. In the step 6, a memory write action is implemented to write the data that is stored in the R1 register into the memory address [2056].

The R1 register is for example an application programming register of the processor. Generally, the application programming registers are usually classified into three types, i.e. general purpose registers, segment registers and status registers. Examples of the general purpose registers include AX, BX, CX or DX registers. Examples of the segment registers include CS or DS registers.

In a case that no register-renaming operation is performed, the above steps need to be orderly implemented to execute the program. That is, the processor will execute the program having six steps according to the specified order as shown in FIG. 1A, so that it takes a relatively longer time period for implementing six steps.

By carefully analyzing the program of FIG. 1A, it is found that the steps 1~3 and the steps 4~6 utilize the same R1 register. Since data are written into the same position, the process of FIG. 1A is output-dependent and usually causes a write-after-write hazard. For avoiding the write-after-write hazard, the steps 1~3 are implemented by the R1 register but the steps 4~6 are implemented by another register (e.g. a R2 register). Under this circumstance, the steps 1~3 and the steps 4~6 could be simultaneously implemented. As shown in FIG. 1B, the steps 1~3 and the steps 4~6 are implemented by different execution units of the processor in parallel. In other words, it takes a relatively shorter time period for implementing three steps when the program is executed. Importantly, after the program is executed, the data stored in the R2 register need to be automatically written back to the R1 register. The process of using another register to replace the register of the source code is also referred as a register-renaming technology. Generally, the result of the register-renaming technology is stored in a register renaming table.

Generally, in a case that exception or branch misprediction occurs, some registers have been renamed and it fails to recover the contents of the register renaming table before occurrence of the exception or the branch misprediction. Under the circumstance, the execution of the program has failure.

Before the program is executed, the program is successively decoded by a decoding unit of the processor, then identification codes (IDs) are successively assigned to respective destination registers of the source codes by a renaming unit of the processor, and the IDs in the register renaming table are updated. Moreover, all refreshed data are recorded in a renaming-history table. If exception or branch misprediction occurs, the register renaming table could recover the contents according to the renaming-history table.

FIG. 2 schematically illustrates a process of executing another program according to the prior art. In the step a, a memory read action is implemented to temporarily store the data of the memory address [1024] into the AX register. At this moment, the AX register is the destination register. In the step b, the data stored in the AX register is added by 2, and then the result is stored in the BX register. At this moment, the BX register is the destination register. In the step c, the data stored in the CX register is temporarily stored in the BX register. At this moment, the BX register is the destination register. In the step d, the data stored in the BX register is added by 5, and then the result is stored in the CX register. At this moment, the CX register is the destination register. In the step e, the data stored in the AX register is added by 3, and then the result is stored in the DX register. At this moment, the DX register is the destination register. In the step f, the data stored in the CX register is temporarily stored in the AX register. At this moment, the AX register is the destination register. In the step g, the data stored in the BX register is added by 4, and then the result is stored in the DX register. At this moment, the DX register is the destination register. In the step h, the data stored in the AX register is added by 5, and then the result is stored in the BX register. At this moment, the BX register is the destination register.

The processes of creating the register renaming table and the renaming-history table when the program as shown in FIG. 2 is executed will be illustrated with reference to FIGS. 3A~3H.

As shown in FIG. 3A, since the AX register is the destination register in the step a, the AX register is renamed as ID1 (i.e. the rename identification code is 1) in the register renaming table. As can be seen in the first row of the renaming-history table, a new ID1 register is added. According to the usage state "1" indicated by the occupy bit field (OC), it is found that ID1 is still valid. Afterwards, the data corresponding to AX will be referred to the data corresponding to ID1. Since the designations of BX, CX and DX are "–" (see FIG. 3A), the data corresponding to BX, CX and DX will be directly referred to the data corresponding to application programming registers BX, CX and DX, respectively.

As shown in FIG. 3B, since the BX register is the destination register in the step b, the register renaming table is updated such that the AX register is renamed as ID1 and the BX register is renamed as ID2 (i.e. the rename identification code is 2). As can be seen in the second row of the renaming-history table, a new ID2 register is added. According to the usage state "1" indicated by the occupy bit field, it is found that ID2 is still valid.

As shown in FIG. 3C, since the BX register is the destination register in the step c, the register renaming table is updated such that the AX register is renamed as ID1 and the BX register is renamed as ID3 (i.e. the rename identification code is 3). As can be seen in the third row of the renaming-history table, a new ID3 register is added. According to the usage state "1" indicated by the occupy bit field, it is found that ID3 is still valid.

As shown in FIG. 3D, since the CX register is the destination register in the step d, the register renaming table is updated such that the AX register is renamed as ID1, the BX register is renamed as ID3 and the CX register is renamed as ID4 (i.e. the rename identification code is 4). As can be seen in the fourth row of the renaming-history table, a new ID4 register is added. According to the usage state "1" indicated by the occupy bit field, it is found that ID4 is still valid.

As shown in FIG. 3E, since the DX register is the destination register in the step e, the register renaming table is updated such that the AX register is renamed as ID1, the BX register is renamed as ID3, the CX register is renamed as ID4 and the DX register is renamed as ID5 (i.e. the rename identification code is 5). As can be seen in the fifth row of the renaming-history table, a new ID5 register is added. According to the usage state "1" indicated by the occupy bit field, it is found that ID5 is still valid.

As shown in FIG. 3F, since the AX register is the destination register in the step e, the register renaming table is updated such that the AX register is renamed as ID6 (i.e. the rename identification code is 6), the BX register is renamed as ID3, the CX register is renamed as ID4 and the DX register is renamed as ID5. As can be seen in the sixth row of the renaming-history table, a new ID6 register is added. According to the usage state "1" indicated by the occupy bit field, it is found that ID6 is still valid.

As shown in FIG. 3G, since the DX register is the destination register in the step g, the register renaming table is updated such that the AX register is renamed as ID6, the BX register is renamed as ID3, the CX register is renamed as ID4 and the DX register is renamed as ID7 (i.e. the rename identification code is 7). As can be seen in the seventh row of the renaming-history table, a new ID7 register is added. According to the usage state "1" indicated by the occupy bit field, it is found that ID7 is still valid.

As shown in FIG. 3H, since the BX register is the destination register in the step h, the register renaming table is updated such that the AX register is renamed as ID6, the BX register is renamed as ID8 (i.e. the rename identification code is 8), the CX register is renamed as ID4 and the DX register is renamed as ID7. As can be seen in the eighth row of the renaming-history table, a new ID8 register is added. According to the usage state "1" indicated by the occupy bit field, it is found that ID8 is still valid.

After the instructions have been executed by the execution units of the processor, the results will be written back to the registers, and the renaming-history table and the register renaming table will be updated. As shown in FIG. 3I, after the data stored in the ID3 register are written back to the BX register, the value of the occupy bit field corresponding to the ID3 register of the renaming-history table cleared to be "0". The usage state "0" indicates that the data stored in the renamed ID3 register has been written back to the BX register. Meanwhile, as shown in FIG. 3J, the ID3 register listed in the renaming-history table should be deleted.

Similarly, as shown in FIG. 3K, after the data stored in the ID4 register are written back to the CX register, the value of the occupy bit field corresponding to the ID4 register of the renaming-history table is cleared to be "0". The usage state "0" indicates that the data stored in the renamed ID4 register has been written back to the CX register. Meanwhile, as shown in FIG. 3L, the ID4 register listed in the renaming-history table and the register renaming table should be deleted. Afterwards, other registers could be renamed as ID3 or ID4 again.

In other words, during the writing-back process, the renamed registers that are listed in the renaming-history table and comply with the writing-back ID will be deleted. Generally, a content addressable memory could be used to meet this requirement, because the operating speed of the content addressable memory is very fast. The content addressable memory, however, still has some drawbacks. For example, the layout area of the circuit of the content addressable memory is too large. In addition, since many data are possibly written back at the same time, the process of inquiring and deleting the contents of the renaming-history table usually consumes much power.

In a case that exception or branch misprediction occurs, the renaming-history table and the register renaming table should recover the contents before occurrence of the exception or the branch misprediction. That is, the data generated after occurrence of the exception or the branch misprediction need to be flushed. In addition, the value of the occupy bit field needs to be cleared to be "0". For preventing from erroneously executing the program, the register renaming table should recover the contents before occurrence of the exception or the branch misprediction.

FIG. 4 schematically illustrates a process of executing a program with a branch misprediction step. As shown in FIG. 4, the program includes nine steps a~i. In comparison with the program of FIG. 2, the branch misprediction that is indicated by "cBranch" occurs in the step f of the program of FIG. 4. Like the descriptions in FIGS. 3A-3L, the data stored in the ID3 register and ID4 register are written back.

FIGS. 5A~5C schematically illustrate a process of recovering the register renaming table and the renaming-history table if branch misprediction occurs when the program as shown in FIG. 4 is executed. As shown in FIG. 5A, the branch misprediction "cBranch" occurs when the program is executed by the processor. Under this circumstance, the data generated after occurrence of the branch misprediction "cBranch" need to be flushed. That is, as shown in FIG. 5B, the data listed in the sixth, seventh, eighth and ninth rows of the renaming-history table should be deleted. In addition, the values of the occupy bit fields corresponding to the ID6, ID7, ID8 and ID9 registers of the renaming-history table are cleared to be "0". Next, as shown in FIG. 5C, the register renaming table recovers the contents before occurrence of the branch misprediction. That is, the register renaming table recovers the contents to be synchronous with the data of the fifth row. Afterwards, the new register renaming operations could be continuously performed and started with the ID6.

From the above discussion, the renamed registers that are listed in the renaming-history table and comply with the writing-back ID are deleted during the writing-back process. This writing-back maintenance operation is usually implemented by using a content addressable memory. Although the operating speed of the content addressable memory is very fast, the process of inquiring and deleting the contents of the renaming-history table usually consumes much power and the layout area of the circuit of the content addressable memory is too large. Moreover, as the size of the renaming-history table is increased, the frequency of comparing the renamed registers with the writing-back ID is increased. Under this circumstance, the performance of executing the program is deteriorated.

SUMMARY OF THE INVENTION

The present invention provides a register renaming table recovery method and a register renaming table recovery system for use in a processor, in which the writing-back maintenance operation is not performed if the exception or the branch misprediction occurs.

In accordance with an aspect of the present invention, there is provided a register renaming table recovery method for use in a processor. Firstly, a flushing operation is performed on a renaming-history table according to a flushed ID. Then, a first renamed ID corresponding to a first register is acquired from an unflushed row of the renaming-history table that is immediately adjacent to the flushed ID. If the first renamed ID is occupied, a register renaming table is updated to rename the first register according to the first renamed ID. Whereas, if the first renamed ID is not occupied, the register renaming table is updated to keep the first register unrenamed.

In accordance with another aspect of the present invention, there is provided a register renaming table recovery system for receiving a plurality of program codes outputted from a decoding unit. The register renaming table recovery system includes a determining unit, a register renaming table, a renaming-history table, a writing-back director, a flushing director, a usage status recognition unit, a multiplexer set, and a checking unit. The determining unit is used for setting multiple renamed IDs according to a plurality of destination registers corresponding to the program codes. The destination registers include multiple application programming registers. The register renaming table records an updated relationship between the application programming registers and the renamed IDs. The renaming-history table records all relationships between the application programming registers and the renamed IDs. The writing-back director is used for outputting a writing-back ID to the renaming-history table. When the writing-back ID is equal to one of the multiple renamed IDs, the specific renamed ID is not occupied. The flushing director is used for generating a flushed ID. A flushing operation is performed on the renaming-history table according to the flushed ID. The usage status recognition unit receives information associated with usage states of the renamed IDs from the renaming-history table and the writing-back ID, thereby generating usage status information. The multiplexer set receives the usage status information after the flushing operation is performed. The multiplexer set judges whether a first renamed ID corresponding to a first register listed in the last row storing at least one renamed ID of the renaming-history table is occupied. If the first renamed ID is occupied, the checking unit updates the register renaming table to rename the first register according to the first renamed ID. Whereas, if the first renamed ID is not occupied, the checking unit updates the register renaming table to deep the first register unrenamed.

BRIEF DESCRIPTION OF THE DRAWINGS

The above contents of the present invention will become more readily apparent to those ordinarily skilled in the art after reviewing the following detailed description and accompanying drawings, in which:

FIG. 1A schematically illustrates a process of executing a program without using a register-renaming technology according to the prior art;

FIG. 1B schematically illustrates a process of executing a program by using a register-renaming technology according to the prior art;

FIG. 2 schematically illustrates a process of executing another program according to the prior art;

FIGS. 3A~3H schematically illustrate a process of creating the register renaming table and the renaming-history table when the program as shown in FIG. 2 is executed;

FIGS. 3I~3L schematically illustrate a process of writing back to the register renaming table and the renaming-history table;

FIG. 4 schematically illustrates a process of executing a program with a branch misprediction step;

FIGS. 5A~5C schematically illustrate a process of recovering the register renaming table and the renaming-history table if branch misprediction occurs when the program as shown in FIG. 4 is executed;

FIGS. 7A~7B schematically illustrate a process of creating the register renaming table and the renaming-history table by executing the program as shown in FIG. 4;

FIGS. 7C~7D schematically illustrate a process of writing back to the register renaming table and the renaming-history table;

FIGS. 7E~7F schematically illustrate a process of flushing the renaming-history table according to the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 6:
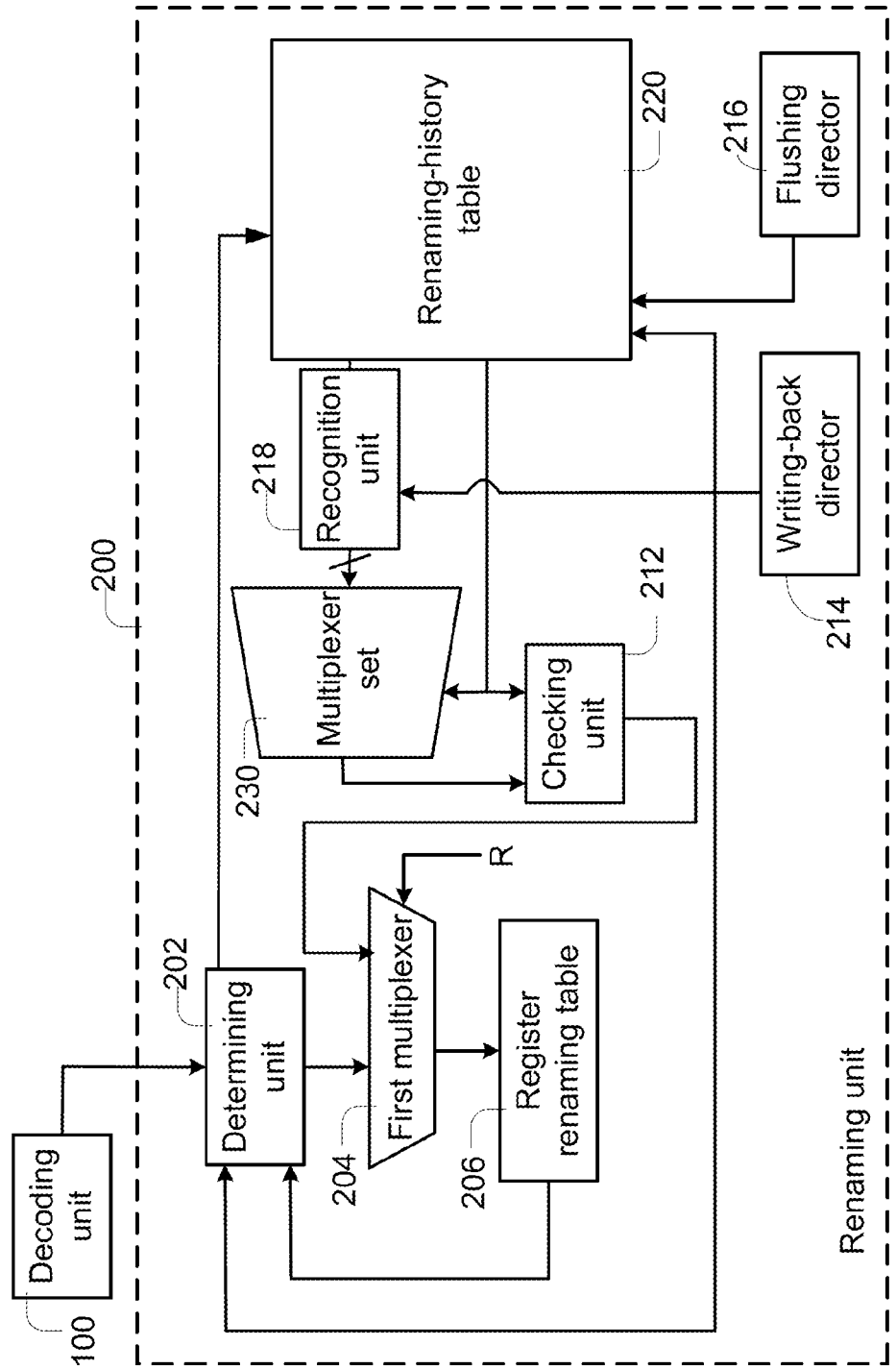
FIG. 6 is a schematic functional block diagram illustrating a register renaming table recovery system according to an embodiment of the present invention.

FIG. 6 is a schematic functional block diagram illustrating a register renaming table recovery system according to an embodiment of the present invention. The register renaming table recovery system is included in a renaming unit 200. As shown in FIG. 6, the register renaming table recovery system comprises a determining unit 202, a first multiplexer 204, a register renaming table 206, a multiplexer set 230, a checking unit 212, a writing-back director 214, a flushing director 216, a usage status recognition unit 218 and a renaming-history table 220. In a case that exception occurs when the program is executed, the flushing director 216 generates a flushed identification code (flushed ID) to the renaming-history table 220. At the same time, the flushing director 216 generates a renaming table recovery control signal R to the first multiplexer 204. According to the flushed ID and the renaming table recovery control signal R, a renaming table recovery operation is performed. A process of controlling the register renaming table and the renaming-history table according to the present invention will be illustrated in more details as follows.

Please refer to FIG. 4 again. The program includes nine steps a~i, and branch misprediction "cBranch" also occurs in the step f of the program of FIG. 4. In a case that branch misprediction occurs when the program is executed, the process of controlling the register renaming table and the renaming-history table will be also done. Moreover, if the renaming table recovery control signal R is in a disabling status, the register renaming table 206 is updated according to the command issued by the determining unit 202.

First of all, the program codes are successively decoded by a decoding unit 100 and then transmitted to the renaming unit 200. Then, a process of creating the register renaming table and the renaming-history table by executing the program as shown in FIG. 4 will be illustrated with reference to FIGS. 7A~7B. In the step a, the AX register is the destination register. As shown in FIG. 7A, when the program code outputted from the decoding unit 100 is received by the determining unit 202, the AX register is renamed as ID1 by the determining unit 202. The identification code ID1 is transmitted to the renaming-history table 220. The identification code ID1 is also transmitted to the register renaming table 206 through the first multiplexer 204. As can be seen in the first row of the renaming-history table, a new ID1 register is added. According to the usage state "1" indicated by the occupy bit field, it is found that ID1 is still valid. The principles of updating the register renaming table 206 and creating the renaming-history table 220 in the steps b~i are similar to those as illustrated in the step a, and are not redundantly described herein. After the step i is completed, the register renaming table 206 and the renaming-history table 220 are shown in FIG. 7B.

FIGS. 7C~7D schematically illustrate a process of writing back to the register renaming table and the renaming-history table. After the instructions have been executed by the execution units of the processor, the results will be written back to the registers, and the renaming-history table and the register renaming table are updated. When a writing-back event occurs, the writing-back director 214 generates a corresponding writing-back identification code (writing-back ID) and then the writing-back ID is outputted to the renaming-history table 220, the usage status recognition unit 218 and the determining unit 202. In an embodiment, the value of the occupy bit field of the renaming-history table 220 is cleared to be "0" according to the writing-back ID generated by the writing-back director 214. In accordance with a key feature of the present invention, the writing-back maintenance operation that is used in the conventional register-renaming technology is not done.

For example, after the program code of the ID3 register has been executed, the writing-back director 214 outputs ID3 to the renaming-history table 220, the usage status recognition unit 218 and the determining unit 202. After the data stored in the ID3 register is written back to the BX register, the value of the occupy bit field corresponding to the ID3 register of the renaming-history table 220 is cleared to be "0" (see FIG. 7C). Since ID3 is not included in the register renaming table 206, the register renaming table 206 will not be updated by the determining unit 202 at this moment. Furthermore, the usage status recognition unit 218 is activated when the recovery operation of the register renaming table 206 is done. In other words, the usage status recognition unit 218 is not activated when ID3 is received.

Similarly, after the program code of the ID4 register has been executed, the writing-back director 214 generates ID4 and then the ID4 is outputted to the renaming-history table 220, the usage status recognition unit 218 and the determining unit 202. After the data stored in the ID4 register is written back to the CX register, the value of the occupy bit field corresponding to the ID4 register of the renaming-history table 220 is cleared to be "0" (see FIG. 7D). Since ID4 is included in the register renaming table 206, the register renaming table 206 will be updated by the determining unit 202. In addition, the usage status recognition unit 218 is not activated when ID4 is received.

FIGS. 7E~7F schematically illustrate a process of flushing the renaming-history table according to the present invention. As shown in FIG. 7E, branch misprediction "cBranch" occurs when the program is executed by the processor. Under this circumstance, the data generated after occurrence of the branch misprediction "cBranch" need to be flushed. Meanwhile, the flushing director 216 generates a flushed identification code (flushed ID), e.g. ID6, to the renaming-history table 220. According to the flushed ID (i.e. ID6), the data listed in the sixth, seventh, eighth and ninth rows of the renaming-history table 220 are deleted (see FIG. 7F). In addition, the values of the occupy bit fields corresponding to the ID6, ID7, ID8 and ID9 registers of the renaming-history table 220 are cleared to be "0". At the same time, the flushing director 216 generates a renaming table recovery control signal R to the first multiplexer 204 in order to recover the contents of the register renaming table 206.

FIGS. 8A-8D schematically illustrate a process of recovering the register renaming table and the renaming-history table according to the present invention. As shown in FIGS. 8A-8D, the multiplexer set 230 comprises an AX multiplexer 232, a BX multiplexer 234, a CX multiplexer 236 and a DX multiplexer 238.

Figure 8A:
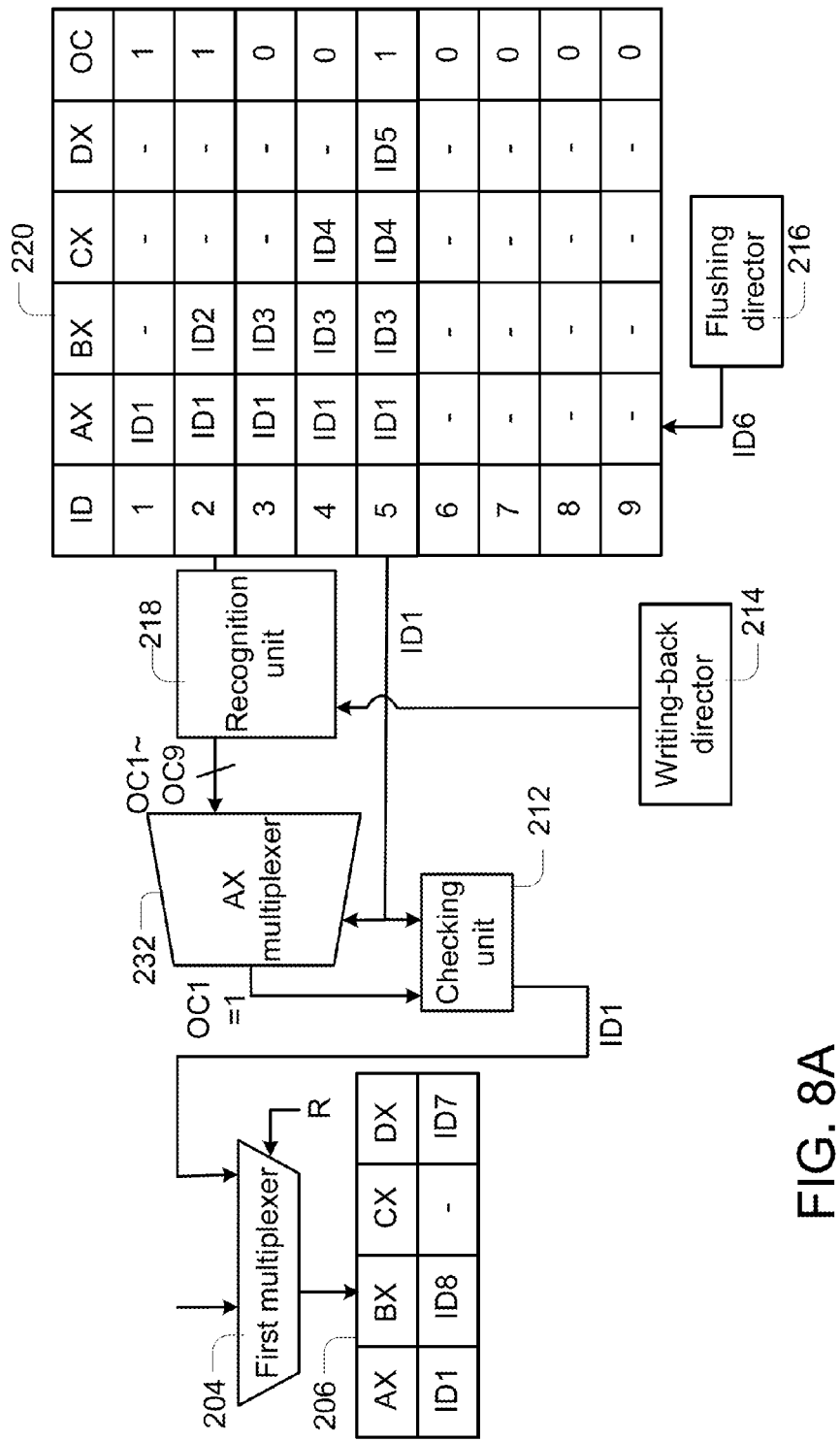
FIGS. 8A~8D schematically illustrate a process of recovering the register renaming table and the renaming-history table according to the present invention.

FIG. 8A schematically illustrates a process of recovering the content associated with the AX register of the register renaming table. According to the flushed ID (i.e. ID6) generated by the flushing director 216, the data listed in the sixth, seventh, eighth and ninth rows of the renaming-history table 220 are deleted. In other words, the contents of the register renaming table 206 are recovered according to the information listed in the previous row of the flushed ID. That is, the register renaming table 206 recovers the contents according to the information listed in the fifth row, which is not flushed in the flushing operation.

Since the AX register corresponding to the fifth row of the renaming-history table 220 has been renamed as ID1, the renamed identification code ID1 is received by the select terminal of the AX multiplexer 232. In addition, the usage states listed in the occupy bit field of the renaming-history table 220 and the output of the writing-back director 214 will be received by the usage status recognition unit 218, thereby generating corresponding usage status information (OC1~OC9) to the input terminal of the AX multiplexer 232. According to the renamed identification code ID1 received by the select terminal of the AX multiplexer 232, the AX multiplexer 232 outputs the usage state indicated by the occupy bit field corresponding to the ID1 register. That is, the usage status information OC1 (="1") is outputted from the AX multiplexer 232. According to the usage status information OC1 (="1"), the checking unit 212 judges that ID1 is valid. Through the first multiplexer 204, the register renaming table 206 recovers the AX register to be renamed as ID1. Afterwards, the data corresponding to AX will be referred to the data corresponding to ID1.

Figure 8B:
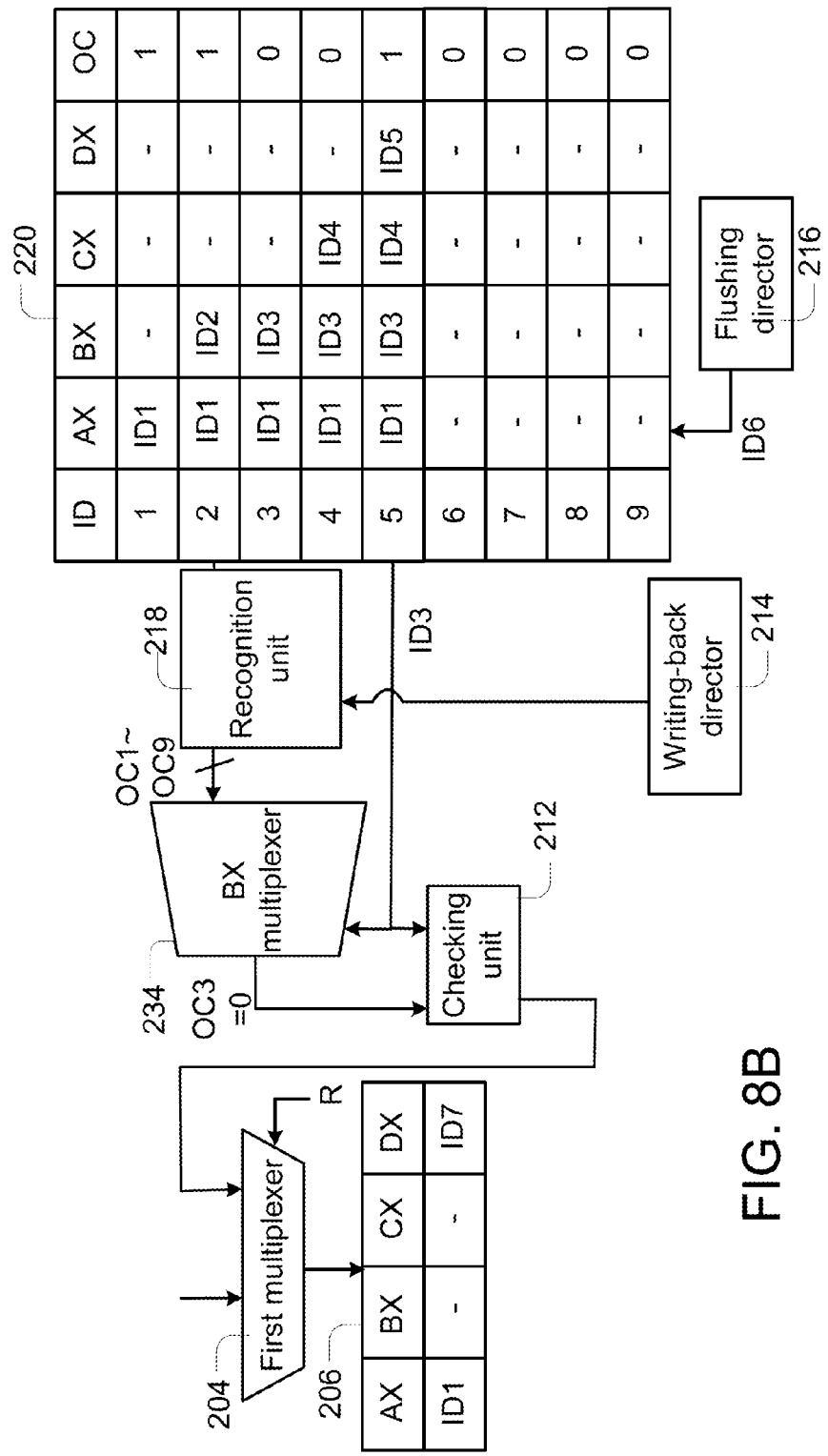

FIG. 8B schematically illustrates a process of recovering the content associated with the BX register of the register renaming table. Since the BX register corresponding to the fifth row of the renaming history table 220 has been renamed as ID3, the renamed identification code ID3 is received by the select terminal of the BX multiplexer 234. In addition, the usage states listed in the occupy bit field of the renaming-history table 220 and the output of the writing-back director 214 will be received by the usage status recognition unit 218, thereby generating corresponding usage status information (OC1~OC9) to the input terminal of the BX multiplexer 234. According to the renamed identification code ID3 received by the select terminal of the BX multiplexer 234, the BX multiplexer 232 outputs the usage state indicated by the occupy bit field corresponding to the ID3 register. That is, the usage status information OC3 (="0") is outputted from the BX multiplexer 234. According to the usage status information OC3 (="0"), the checking unit 212 judges that ID3 is invalid. The checking unit 212 will delete content associated with the BX register through the first multiplexer 204, and thus a designation "–" is shown in the corresponding field of the register renaming table 206. Afterwards, the data corresponding to BX will be referred to the data corresponding to the application programming register BX.

Figure 8C:
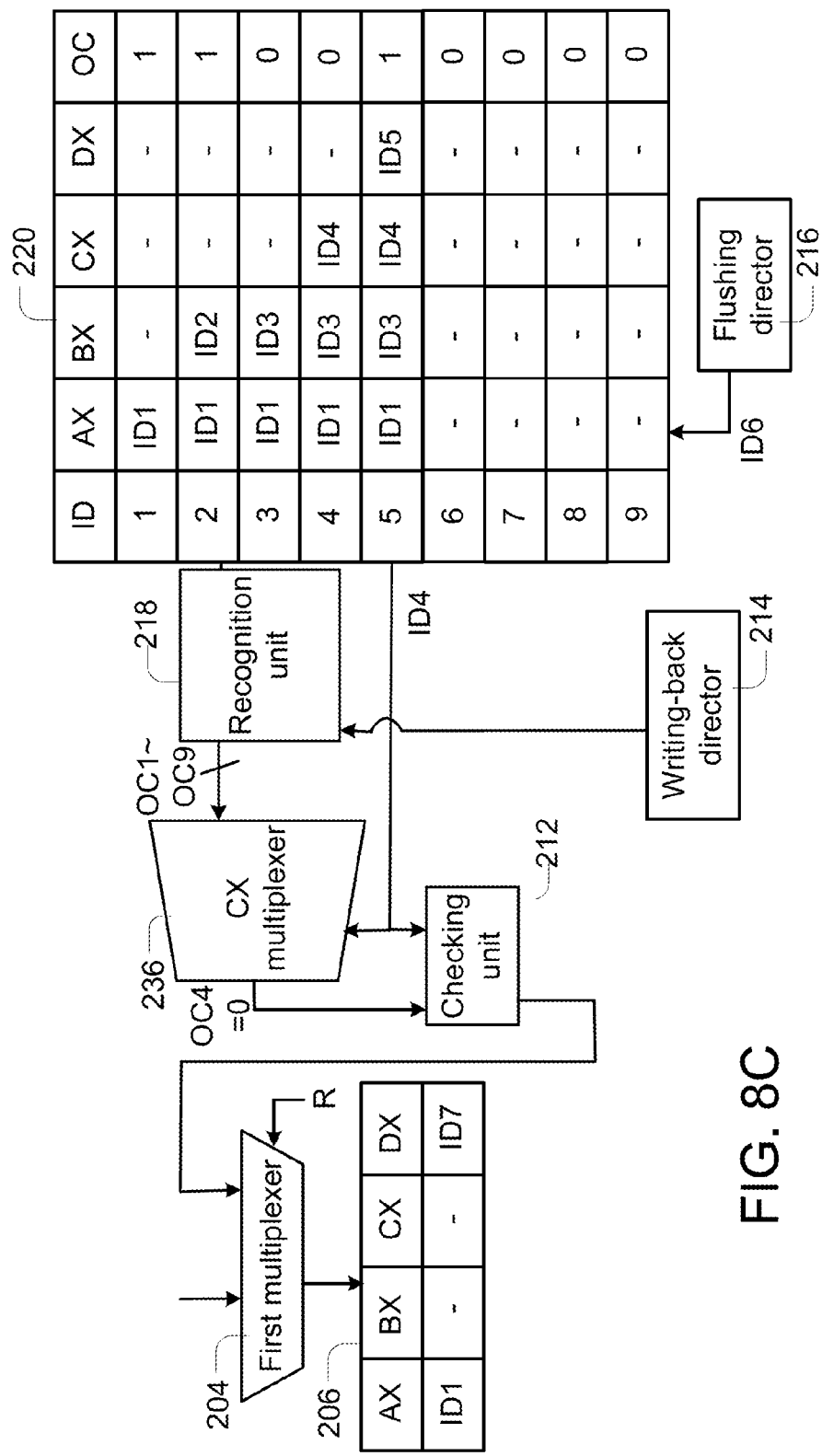

FIG. 8C schematically illustrates a process of recovering the content associated with the CX register of the register renaming table. Since the CX register corresponding to the fifth row has been renamed as ID4, the renamed identification code ID4 is received by the select terminal of the CX multiplexer 236. In addition, the usage states listed in the occupy bit field of the renaming-history table 220 and the output of the writing-back director 214 will be received by the usage status recognition unit 218, thereby generating corresponding usage status information (OC1~OC9) to the input terminal of the CX multiplexer 236. According to the renamed identification code ID4 received by the select terminal of the CX multiplexer 236, the CX multiplexer 232 outputs the usage state indicated by the occupy bit field corresponding to the ID4 register. That is, the usage status information OC4 (="0") is outputted from the CX multiplexer 236. According to the usage status information OC4 (="0"), the checking unit 212 judges that ID4 is invalid. The checking unit 212 will delete the content associated with the CX register through the first multiplexer 204, and thus a designation "–" is shown in the corresponding field of the register renaming table 206. Afterwards, the data corresponding to CX will be referred to the data corresponding to the application programming register CX.

Figure 8D:
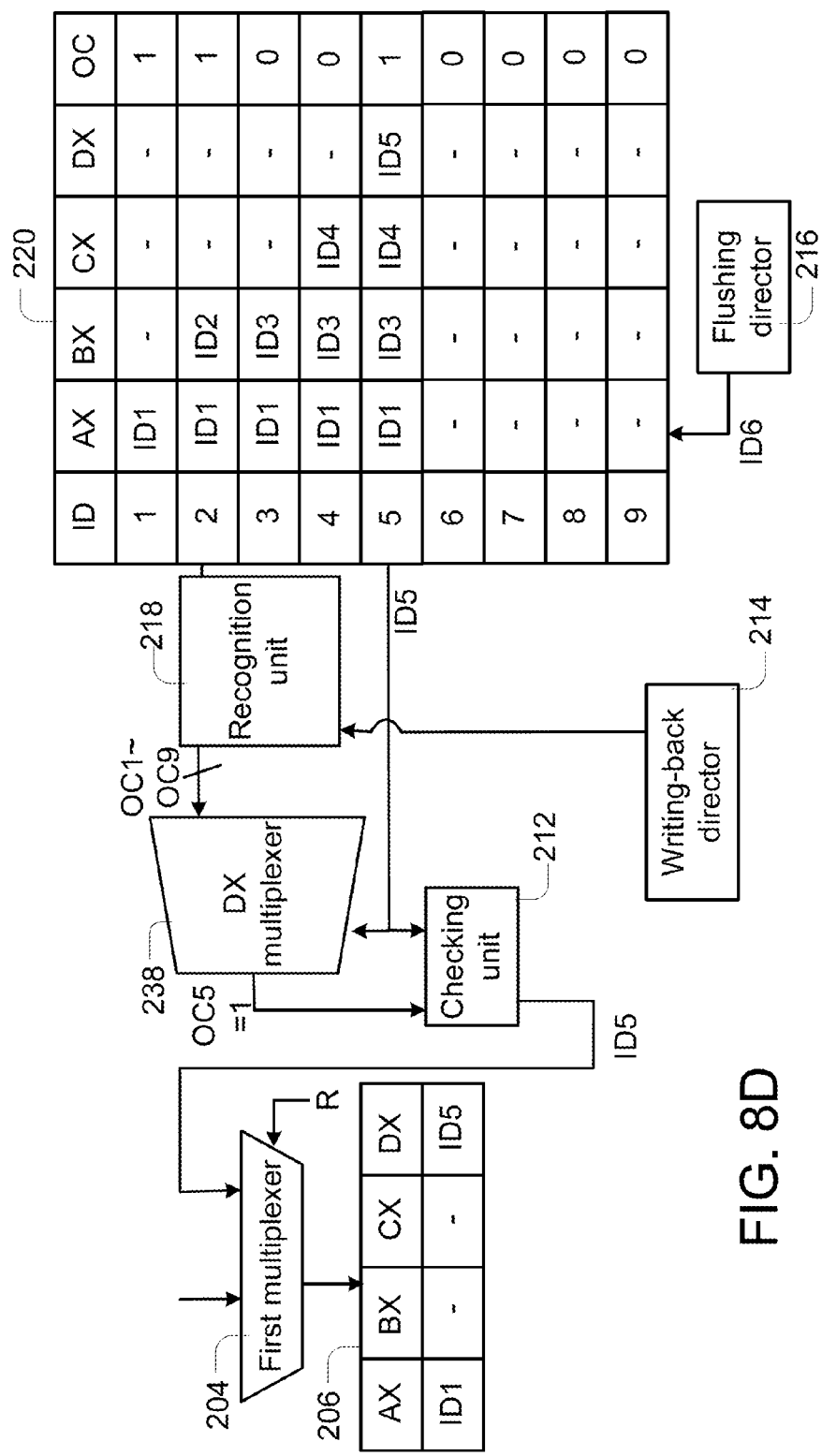

FIG. 8D schematically illustrates a process of recovering the content associated with the DX register of the register renaming table. Since the DX register corresponding to the fifth row of the renaming-history table 220 has been renamed as ID5, the renamed identification code ID5 is received by the select terminal of the DX multiplexer 238. In addition, the usage states listed in the occupy bit field of the renaming-history table 220 and the output of the writing-back director 214 will be received by the usage status recognition unit 218, thereby generating corresponding usage status information (OC1~OC9) to the input terminal of the DX multiplexer 238. According to the renamed identification code ID5 received by the select terminal of the DX multiplexer 238, the DX multiplexer 238 outputs the usage state indicated by the occupy bit field corresponding to the ID5 register. That is, the usage status information OC5 (="1") is outputted from the DX multiplexer 238. According to the usage status information OC5 (="1"), the checking unit 212 judges that ID5 is valid. Through the first multiplexer 204, the register renaming table 206 recovers the DX register to be renamed as ID5. Afterwards, the data corresponding to DX will be referred to the data corresponding to ID5.

In this embodiment, if a writing-back ID is generated by the writing-back director 214 when the usage states listed in the occupy bit field of the renaming-history table 220 are received by the usage status recognition unit 218, the value of the occupy bit field of the renaming-history table 220 corresponding to the writing-back ID will be cleared to be "0". As such, the usage status recognition unit 218 will output the usage status information (OC1~OC9).

From the above description, since no writing-back maintenance operation is performed according to the present invention, the renaming-history table is not necessarily stored in the content addressable memory. Moreover, if exception or branch misprediction occurs, the register renaming table could recover the accurate contents according to the renaming-history table.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A register renaming table recovery method for use in a processor, the register renaming table recovery method comprising steps of:
performing a flushing operation on a renaming-history table according to a flushed identification code (ID);
acquiring a first renamed ID corresponding to a first register from an unflushed row of the renaming-history table that is immediately adjacent to a row corresponding to the flushed ID;
updating a register renaming table to rename the first register according to the first renamed ID if the first renamed ID is occupied; and
updating the register renaming table to keep the first register unrenamed if the first renamed ID is not occupied.

2. The register renaming table recovery method according to claim 1 wherein the first register is one of multiple application programming registers.

3. The register renaming table recovery method according to claim 2 wherein the application programming registers include general purpose registers, segment registers and status registers.

4. The register renaming table recovery method according to claim 3 wherein the general purpose registers include AX, BX, CX or DX registers, and the segment registers include CS or DS registers.

5. The register renaming table recovery method according to claim 1 wherein the first renamed ID is not occupied when a writing-back ID generated by the processor is equal to the first renamed ID.

6. The register renaming table recovery method according to claim 1 wherein the first renamed ID is occupied when all of multiple writing-back IDs generated by the processor are not equal to the first renamed ID.

7. The register renaming table recovery method according to claim 1 wherein the flushed ID is generated by the processor if an exception or branch misprediction occurs.

8. The register renaming table recovery method according to claim 1 wherein the renaming-history table further comprises an occupy bit field corresponding to the first renamed ID, wherein the first renamed ID is occupied when a value of the occupy bit field is "1", and the first renamed ID is not occupied when the value of the occupy bit field is "0".

9. A register renaming table recovery system for receiving a plurality of program codes outputted from a decoding unit, the register renaming table recovery system comprising:
a determining unit for setting multiple renamed identification codes (IDs) according to a plurality of destination registers corresponding to the program codes, wherein the destination registers comprise multiple application programming registers;

a register renaming table for recording an updated relationship between the application programming registers and the renamed IDs;

a renaming-history table for recording all relationships between the application programming registers and the renamed IDs;

a writing-back director for outputting a writing-back ID to the renaming-history table, wherein when the writing-back ID is equal to one of the multiple renamed IDs, the one of the multiple renamed IDs is not occupied;

a flushing director for generating a flushed ID, wherein a flushing operation is performed on the renaming-history table according to the flushed ID;

a usage status recognition unit for receiving information associated with usage states of the renamed IDs from the renaming-history table and the writing-back ID, thereby generating usage status information;

a multiplexer set for receiving the usage status information after the flushing operation is performed, wherein the multiplexer set judges whether a first renamed ID corresponding to a first register listed in the last row storing at least one renamed ID of the renaming-history table is occupied; and a checking unit for updating the register renaming table to rename the first register according to the first renamed ID if the first renamed ID is occupied, or updating the register renaming table to keep the first register unrenamed if the first renamed ID is not occupied.

10. The register renaming table recovery system according to claim 9 wherein the first register is one of the multiple application programming registers.

11. The register renaming table recovery system according to claim 10 wherein the application programming registers include general purpose registers, segment registers and status registers.

12. The register renaming table recovery system according to claim 11 wherein the general purpose registers include AX, BX, CX or DX registers, and the segment registers include CS or DS registers.

13. The register renaming table recovery system according to claim 9 wherein the flushed ID is generated by the processor if an exception or branch misprediction occurs.

14. The register renaming table recovery system according to claim 9 wherein the register renaming table recovery system further comprises a first multiplexer for receiving a renaming table recovery control signal when the flushing operation is performed, and updating the register renaming table according to a checking result of the checking unit.

15. The register renaming table recovery system according to claim 9 wherein the renaming-history table further comprises an occupy bit field corresponding to the first renamed ID, wherein the first renamed ID is occupied when a value of the occupy bit field is "1", and the first renamed ID is not occupied when the value of the occupy bit field is "0".

* * * * *